(12) United States Patent
Hyodo

(10) Patent No.: US 12,718,693 B2
(45) Date of Patent: Aug. 25, 2026

(54) COMPUTATION DEVICE AND LANE FORMING METHOD

(71) Applicant: HITACHI ASTEMO, LTD., Hitachinaka (JP)

(72) Inventor: Akihiko Hyodo, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 146 days.

(21) Appl. No.: 18/563,511

(22) PCT Filed: Mar. 8, 2022

(86) PCT No.: PCT/JP2022/010118

§ 371 (c)(1),
(2) Date: Nov. 22, 2023

(87) PCT Pub. No.: WO2022/264548

PCT Pub. Date: Dec. 22, 2022

(65) Prior Publication Data

US 2025/0078661 A1 Mar. 6, 2025

(30) Foreign Application Priority Data

Jun. 17, 2021 (JP) ................................. 2021-100814

(51) Int. Cl.
*G08G 1/16* (2006.01)
*B60W 60/00* (2020.01)

(52) U.S. Cl.
CPC ........... *G08G 1/167* (2013.01); *B60W 60/001* (2020.02)

(58) Field of Classification Search
None
See application file for complete search history.

(56) References Cited

U.S. PATENT DOCUMENTS

| | | | | |
|---|---|---|---|---|
| 2017/0108342 | A1* | 4/2017 | Foreman | G01C 21/3691 |
| 2017/0122749 | A1 | 5/2017 | Urano et al. | |
| 2019/0367021 | A1 | 12/2019 | Zhao et al. | |
| 2020/0130682 | A1* | 4/2020 | Buerkle | B60W 30/0956 |

FOREIGN PATENT DOCUMENTS

| | | |
|---|---|---|
| JP | 2007-079653 A | 3/2007 |
| JP | 2017-090548 A | 5/2017 |
| JP | 2021-009655 A | 1/2021 |

OTHER PUBLICATIONS

International Search Report with English Translation and Written Opinion dated Apr. 12, 2022 in corresponding International Patent Application No. PCT/JP2022/010118 (10 pages).

* cited by examiner

*Primary Examiner* — Donald J Wallace
*Assistant Examiner* — Paysun Wu
(74) *Attorney, Agent, or Firm* — Foley & Lardner LLP

(57) ABSTRACT

A computation device includes a map acquisition unit that acquires map information in a lane level; an obstruction information acquisition unit that acquires passing obstruction information on a lane on which a vehicle advancing in a first direction travels; and a temporary lane forming unit that divides lane information of the map information into sections based on the passing obstruction information, and updates a map attribute in the lane information that is divided to form a temporary lane in which at least a region where the vehicle advancing in the first direction cannot travel is changed to a region where the vehicle advancing in the first direction can travel.

7 Claims, 8 Drawing Sheets

COMPUTATION DEVICE AND LANE FORMING METHOD

TECHNICAL FIELD

The present invention relates to a computation device and a lane forming method.

BACKGROUND ART

Research and development for assisting driving of vehicles are being actively conducted. PTL 1 discloses a surrounding object recognition method including a sensor that acquires spatial positional information of an object in a surrounding environment; and a controller that recognizes an object present around a host vehicle based on the spatial positional information acquired by the sensor, in which the controller recognizes, based on the spatial positional information, a lane blocking region that is an region where a lane is blocked by an object that obstructs traveling of the host vehicle, and extends the lane blocking region by connecting the spatial positional information of the object in a lane advancing direction starting from a start point of the lane blocking region.

CITATION LIST

Patent Literature

PTL 1: JP 2021-009655 A

SUMMARY OF INVENTION

Technical Problem

In the invention described in PTL 1, it is not assumed that a map is rewritten.

Solution to Problem

A computation device according to a first aspect of the present invention includes a map acquisition unit that acquires map information in a lane level, an obstruction information acquisition unit that acquires passing obstruction information on a lane on which a vehicle advancing in a first direction travels; and a temporary lane forming unit that divides lane information of the map information into sections based on the passing obstruction information, and updates a map attribute in the lane information that is divided to form a temporary lane in which at least a region where the vehicle advancing in the first direction cannot travel is changed to a region where the vehicle advancing in the first direction can travel.

A lane forming method according to a second aspect of the present invention is a lane forming method executed by a computer, the lane forming method including acquiring map information in a lane level; acquiring passing obstruction information on a lane on which a vehicle advancing in a first direction travels; and dividing lane information of the map information into sections based on the passing obstruction information, and updating a map attribute in the lane information that is divided to form a temporary lane in which at least a region where the vehicle advancing in the first direction cannot travel is changed to a region where the vehicle advancing in the first direction can travel.

Advantageous Effects of Invention

According to the present invention, it is possible to generate, on a map, a temporary lane in which a region that cannot originally pass is rewritten so as to be passable.

DESCRIPTION OF EMBODIMENTS

First Embodiment

Hereinafter, a first embodiment of a computation device will be described with reference to FIGS. 1 to 7.

Figure 1:
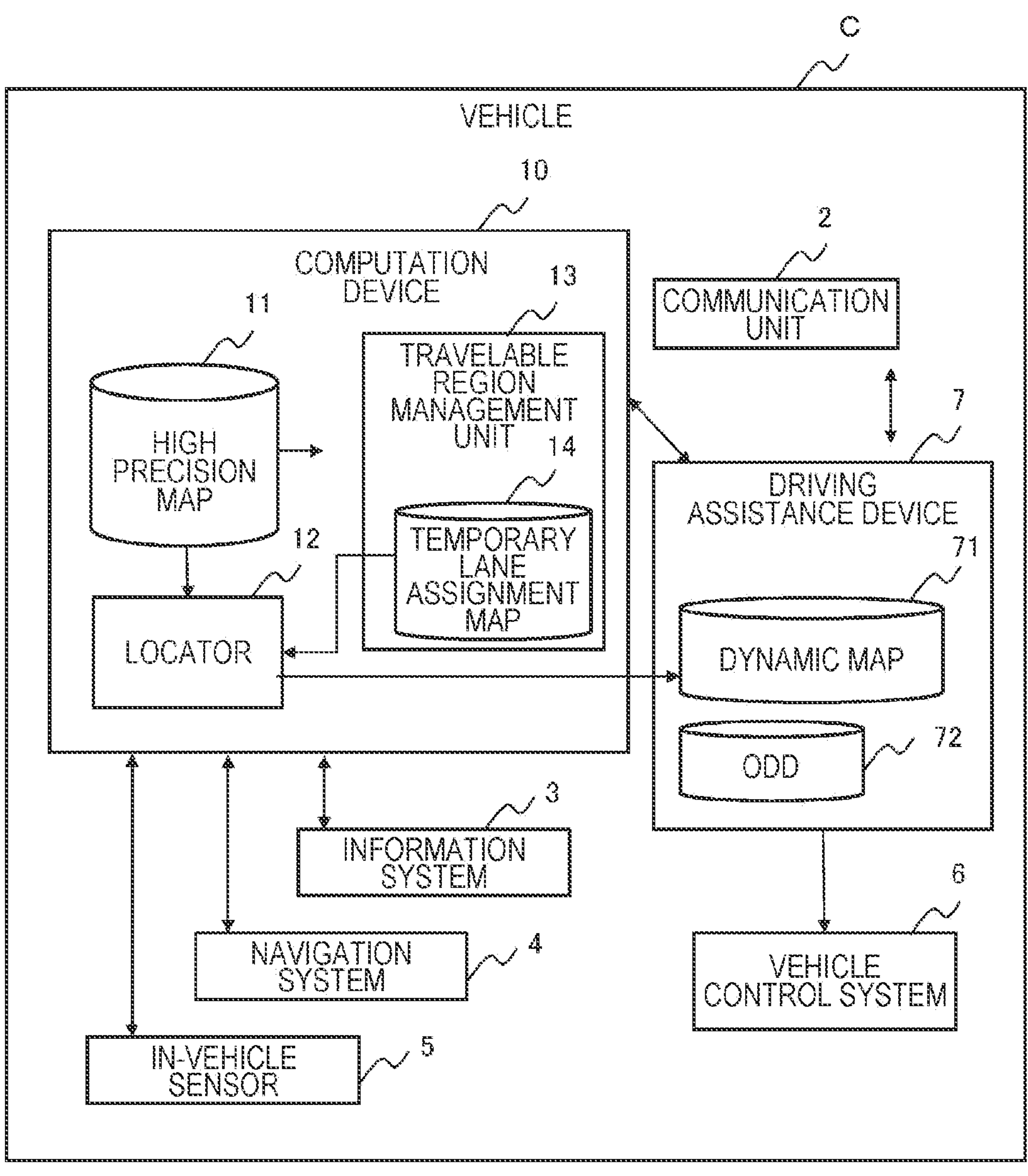
FIG. 1 is a functional configuration diagram of a vehicle equipped with a computation device according to a first embodiment.

FIG. 1 is a functional configuration diagram of a vehicle C equipped with a computation device 10. The vehicle C is an emergency vehicle such as an ambulance or a patrol car. The vehicle C includes a computation device 10, a communication unit 2, an information system 3, a navigation system 4, an in-vehicle sensor 5, a vehicle control system 6, and a driving assistance device 7. The computation device 10 includes a high precision map 11, a locator 12, and a travelable region management unit 13. The travelable region management unit 13 includes a temporary lane assignment map 14. The driving assistance device 7 includes a dynamic map 71 and an ODD 72.

The computation device 10 may be, for example, an electronic control unit (ECU), and includes a CPU that is a central processing unit, a ROM that is a read-only storage device, and a RAM that is a readable/writable storage device, and the CPU develops and executes a program stored in the ROM in the RAM, thereby realizing the locator 12 and the travelable region management unit 13. The locator 12 and the travelable region management unit 13 may be realized by a field programmable gate array (FPGA) which is a rewritable logic circuit or an application specific integrated circuit (ASIC) which is an application specific integrated circuit instead of a combination of the CPU, the ROM, and the RAM. Furthermore, the locator 12 and the travelable region management unit 13 may be realized by a combination of different configurations, for example, a combination of a CPU, a ROM, a RAM, and an FPGA, instead of the combination of the CPU, the ROM, and the RAM.

The high precision map 11 is lane-level high precision map information that is stored in a nonvolatile storage device, for example, a flash memory, and enables automatic driving of the vehicle C. The high precision map 11 includes information on nodes which are intersections and road ends, and information on links connecting the nodes. The information on the node is an identifier of the node, a combination of latitude and longitude that are positional information, an elevation, the number of links to be connected, and the like. The information of the link includes an identifier of the link, the number of lanes, the latitude and longitude of the interpolation point included in each lane, the width of the lane, the traffic restriction for each lane, the inclination of the ground for each lane, the curvature radius for each lane, the number of lanes for each link, the traffic restriction for each link, and the like. The information of the number of lanes is, for example, information of "north direction is two lanes and south direction is two lanes". The traffic restriction includes no entry, limiting speed, no right turn, and the like. The traffic regulation also includes a combination with a time zone. Hereinafter, the information of the like is also referred to as "map attribute".

The temporary lane assignment map 14 is obtained by partially rewriting information of some areas included in the high precision map 11. As will be described in detail later, the temporary lane assignment map 14 is preferentially referred to over the high precision map 11. The dynamic map 71 is generated by the driving assistance device 7 based on the output of the locator 12. The ODD 72 is information of an operational design domain, and is a traveling environmental condition under which the vehicle C can be automatically driven, for example, the number of lanes, the presence or absence of a road section line, the inclination in the advancing direction and the width direction, the curvature radius, and the speed. Although the ODD 72 is a universal condition not associated with a specific road, the ODD 72 with a region limited in the high precision map 11 or the temporary lane assignment map 14 may be included. Note that the ODD 72 can also be referred to as "information regarding driving assistance of the vehicle C".

The communication unit 2 is a communication device that communicates with the outside of the vehicle C, and realizes at least one of road-to-vehicle communication and vehicle-to-vehicle communication. The information system 3 acquires information regarding restricted traffic of a road, for example, information regarding occurrence of an accident vehicle or a construction schedule from the outside of the vehicle C, and outputs the information to the computation device 10. The information regarding the restricted traffic of the road is, for example, information of "In the link with an ID of xx, the first lane is impassable in the section of 10 m in the north direction from the point of latitude L1 and longitude L2". The navigation system 4 calculates a route to a destination of the vehicle C. In the present embodiment, a route to a destination is calculated in advance, and information of a route on which the vehicle C is to travel from now, for example, that on which identifiers of the nodes are arranged in order of traveling is output to the computation device 10.

The in-vehicle sensor 5 acquires information on an obstacle present around the vehicle C and the current position of the vehicle C. The in-vehicle sensor 5 is, for example, a combination of a receiver used to calculate positional information, a camera that detects an obstacle, and a sensor computation unit. The receiver described above is a receiver that configures a satellite navigation system. The sensor computation unit calculates the current position of the vehicle C using information included in radio waves received from a plurality of satellites. Furthermore, the sensor computation unit processes an image captured by the camera, performs pattern matching process, for example, and detects an obstacle that obstructs the passing of the vehicle C. The sensor computation unit outputs information on an obstacle present around the vehicle C and the current position of the vehicle C to the computation device 10.

The vehicle control system 6 controls at least one of an accelerator, a brake, and a steering of the vehicle C based on an operation command of the driving assistance device 7. The control of the accelerator includes control of the engine speed when the vehicle C is equipped with an engine, and includes control of the motor speed when the vehicle C is equipped with a motor.

The driving assistance device 7 performs the following three processes. Firstly, the driving assistance device 7 integrates the outputs of the computation device 10 to create the dynamic map 71. Since the computation device 10 continues to output a part of the high precision map 11 and the temporary lane assignment map 14 regarding the periphery and the advancing direction of the vehicle C, the driving assistance device 7 integrates the outputs of the computation device 10 to obtain the dynamic map 71. However, if the integration is continued, the dynamic map 71 becomes large with elapse of time, and thus the driving assistance device 7 deletes information of a region satisfying a predetermined condition, for example, information of a region 10 m or more behind the advancing direction of the vehicle C from the dynamic map 71.

Secondly, the driving assistance device 7 gives an operation command of at least one of an accelerator, a brake, and a steering of the vehicle C using the travel route information provided from the dynamic map 71 and the navigation system 4. Specifically, the driving assistance device 7 outputs an operation command to the vehicle control system 6 so that the vehicle C travels on the route set by the navigation system 4. The driving assistance device 7 includes the ODD 72, and when determined that the traveling region of the vehicle C does not satisfy the condition of the ODD 72, the driving assistance device 7 warns the user using a notification unit (not illustrated) and interrupts the driving assistance.

Thirdly, the driving assistance device 7 causes the communication unit 2 to transmit the dynamic map 71. When the communication unit 2 transmits the dynamic map 71 to surrounding vehicles or the like, the surrounding vehicles can recognize the information of the temporary lanes included in the dynamic map 71 and avoid collision with the vehicle C. When the surrounding vehicle is an emergency vehicle, the emergency vehicle may also pass the temporary lane included in the received dynamic map 71.

The travelable region management unit 13 rewrites a part of the high precision map 11 to generate the temporary lane assignment map 14. The locator 12 reads out the information of the high precision map 11 of the periphery of the vehicle C based on the current position of the vehicle C obtained from the in-vehicle sensor 5, and outputs the information to the driving assistance device 7. However, when the temporary lane assignment map 14 is obtained, the locator 12 preferentially reads the temporary lane assignment map 14 over the high precision map 11.

Figure 2:
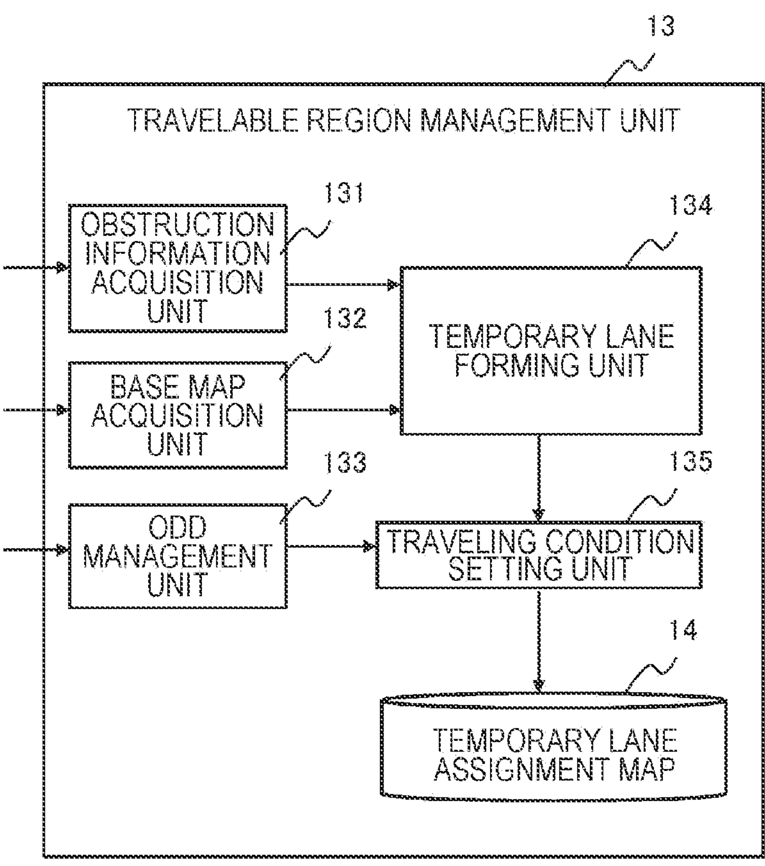
FIG. 2 is a functional configuration diagram of a travelable region management unit.

FIG. 2 is a functional configuration diagram of the travelable region management unit 13. The travelable region management unit 13 includes an obstruction information acquisition unit 131, a base map acquisition unit 132, an ODD management unit 133, a temporary lane forming unit 134, and a traveling condition setting unit 135.

The obstruction information acquisition unit 131 acquires information regarding the restricted traffic of the traveling path from the information system 3 and outputs the information to the temporary lane forming unit 134. However, the obstruction information acquisition unit 131 may obtain, based on the positional information of the vehicle C calculated by the in-vehicle sensor 5, information regarding the restricted traffic of the traveling path limited to a predetermined distance around the vehicle C, for example, within a radius of 1 km. The base map acquisition unit 132 acquires, based on the positional information of the vehicle C calculated by the in-vehicle sensor 5, information of a high precision map within a predetermined distance around the vehicle C, for example, a radius of 1 km from the high precision map 11, and outputs the information to the temporary lane forming unit 134.

The ODD management unit 133 reads the ODD 72 from the driving assistance device 7, and outputs the ODD to the traveling condition setting unit 135. The temporary lane forming unit 134 forms a temporary lane based on the obstruction information output by the obstruction information acquisition unit 131 and the information of the high precision map output by the base map acquisition unit 132. The formation of the temporary lane will be described in detail later. The traveling condition setting unit 135 sets a speed limit to the temporary lane formed by the temporary lane forming unit 134. For this speed, for example, the lowest speed among the maximum speed at which the automatic driving is possible in the ODD 72, the maximum speed at which the vehicle can travel calculated from the curvature of the temporary lane, and the limiting speed of the road on which the temporary lane is formed is set.

The processing of the temporary lane forming unit 134 will be described with reference to FIGS. 3 to 6. The processing of the temporary lane forming unit 134 varies depending on the number of lanes of the road where the fault has occurred. A case where the number of lanes of the opposing lane is two or more will be described first, and a case where the number of lanes of the opposing lane is less than two will be described next.

Figure 3:
FIG. 3 is a diagram for explaining processing of a temporary lane forming unit in a case where the number of lanes of an opposing lane is two or more.
Figure 3:
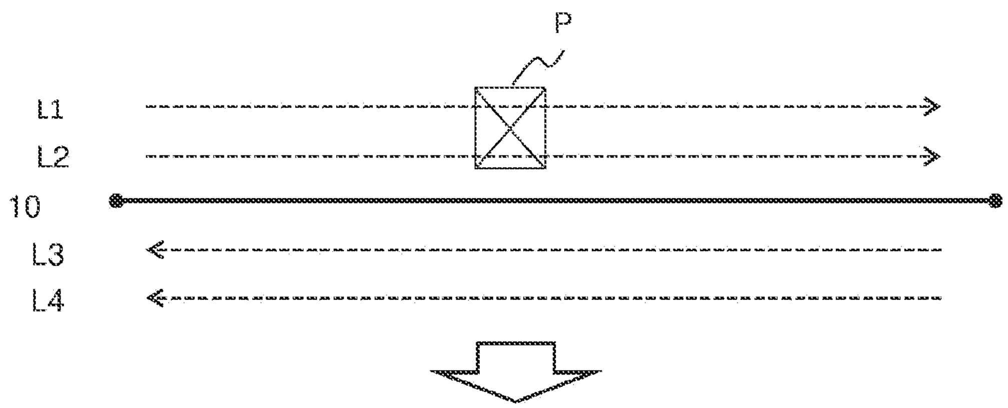
Figure 3:
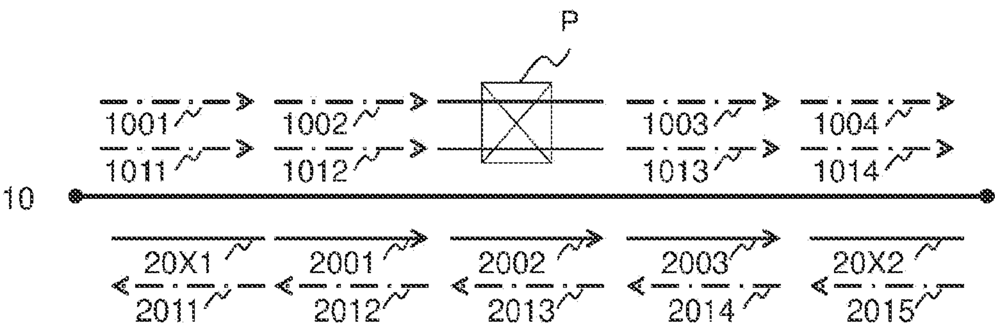

The upper part of FIG. 3 illustrates lane information generated from the information of the high precision map 11, and the lower part of FIG. 3 illustrates lane information after the temporary lane is formed by the temporary lane forming unit 134. However, in the upper part of FIG. 3, an object (hereinafter referred to as "passing obstacle") that becomes an obstacle in passing indicated by reference sign P is generated from the information regarding restricted traffic acquired by the obstruction information acquisition unit 131. The link shown in FIG. 3 has two lanes on each side, four lanes in total. In FIG. 3, passing obstacle occurs across two lanes of a reference numeral 100 and the rightward direction in the drawing. In this example, the vehicle C travels in the rightward direction in the drawing. Hereinafter, the rightward direction in the drawing is also referred to as a "first direction", and the leftward direction in the drawing is also referred to as a "second direction".

The temporary lane forming unit 134 first calculates the granularity of the section into which the existing lane is divided, in other words, the length of the section. There are at least two types of sections, a section corresponding to the passing obstacle P and a lane change section. The length of the section corresponding to the passing obstacle P is determined based on the length of the passing obstacle P. For example, the length of the section corresponding to the passing obstacle P may be the length of the passing obstacle P itself, or may be a length obtained by multiplying the length of the passing obstacle P by a predetermined coefficient, for example, "1.5". Furthermore, a lower limit value of a length of a section corresponding to the passing obstacle P may be defined, and for example, a distance traveled for 1 second at a limiting speed of a link where the passing obstacle P exists may be set as the lower limit value. In the lower diagram of FIG. 3, reference numeral 2002 and reference numeral 2013 are sections corresponding to the obstacle region.

The length of the lane change section is determined based on the limiting speed of the region. For example, the length of the lane change section may be a distance for traveling for 3 seconds at the limiting speed of the region. When the limiting speed of the link illustrated in FIG. 3 is 60 km/h, the length of the lane change section is about 50 m. In the lower diagram of FIG. 3, reference numerals 1002, 1012, 2001, 1003, 1013, 2003, and 2014 are sections corresponding to the obstacle region.

Next, the temporary lane forming unit 134 sets one adjacent lane of the opposite lane as a temporary lane. That is, sections indicated by reference numerals 2001, 2002, and 2003 in the lower part of FIG. 3 are set as temporary lanes, and the direction in which the vehicle travels is changed to the right side in the drawing as indicated by the directions of these arrows. Note that this temporary lane is a region where there is an opposite lane for the vehicle C traveling in the rightward direction in the drawing, and is a region where the vehicle C cannot originally travel. Then, the section adjacent to the lane change section in the adjacent lane of the opposite lane, that is, the sections indicated by reference numerals 20X1 and 20X2 are set as the prohibited lanes in which traveling is prohibited. The center of the section indicated by reference numeral 2002 is set at a position coinciding with the center of the passing obstacle P in the left-right direction in the drawing.

Next, the traveling condition setting unit 135 sets the traveling condition in the temporary lane set by the temporary lane forming unit 134, that is, the section indicated by reference numerals 2001 to 2003. As described above, this traveling condition is the lowest speed among the maximum speed at which the automatic driving is possible in the ODD 72, the maximum speed at which the vehicle can travel calculated from the curvature of the temporary lane, and the road on which the temporary lane is formed, that is, the limiting speed at the node N10. Note that the curvature of the temporary lane is a ratio of the length of the lane change section with respect to the interval between the lane L2 and the lane L3, and is set to a lower speed the larger the steering angle.

Figure 4:
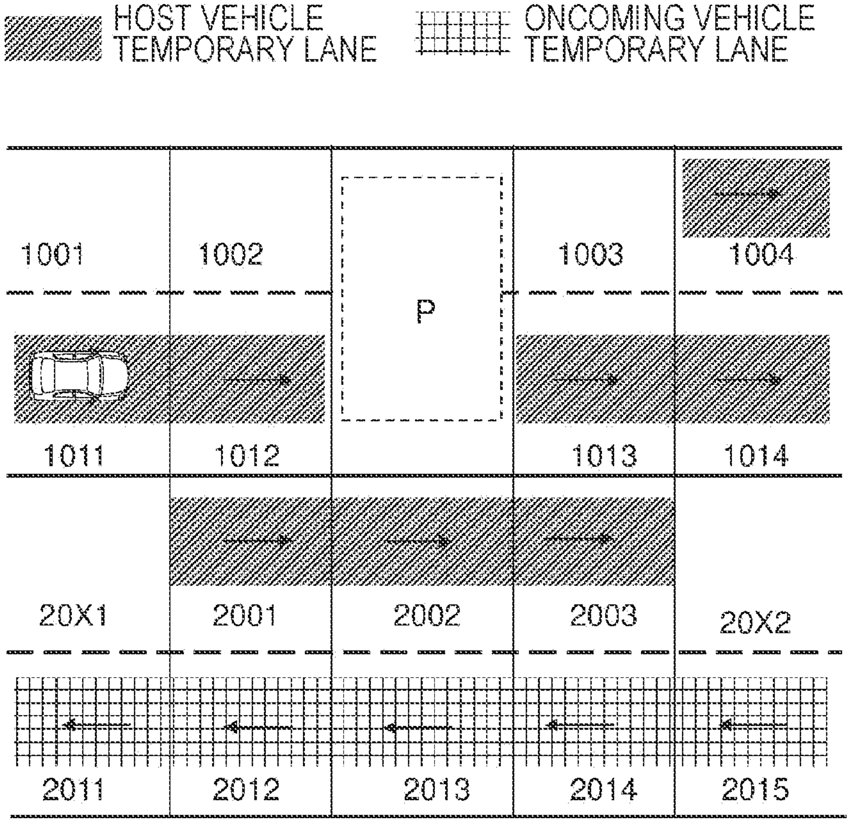
FIG. 4 is a diagram for explaining processing of a temporary lane forming unit in a case where the number of lanes of an opposing lane is two or more.

FIG. 4 is a diagram illustrating temporary lanes set by the temporary lane forming unit 134 in the example of FIG. 3. In FIG. 4, the temporary lane of the host vehicle is shown by hatching with diagonal lines, and the temporary lane of the oncoming vehicle is indicated by hatching with grids. As described above, in the examples illustrated in FIGS. 3 and 4, one lane of the opposing lane is used as a temporary lane as it is. However, the information on the temporary lane of the oncoming vehicle may be information indicating that one lane close to the center cannot travel in the range illustrated in FIG. 4.

Figure 5:
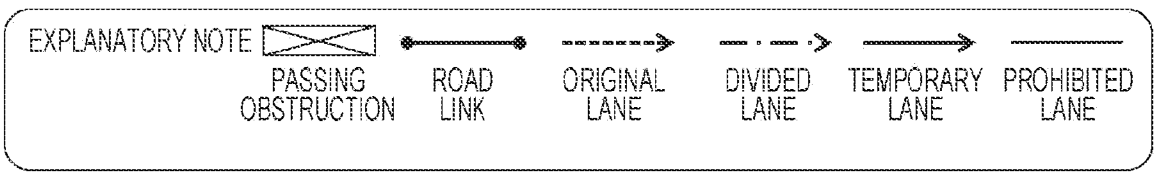
FIG. 5 is a diagram for explaining processing of a temporary lane forming unit in a case where the number of lanes of an opposing lane is one.
Figure 5:
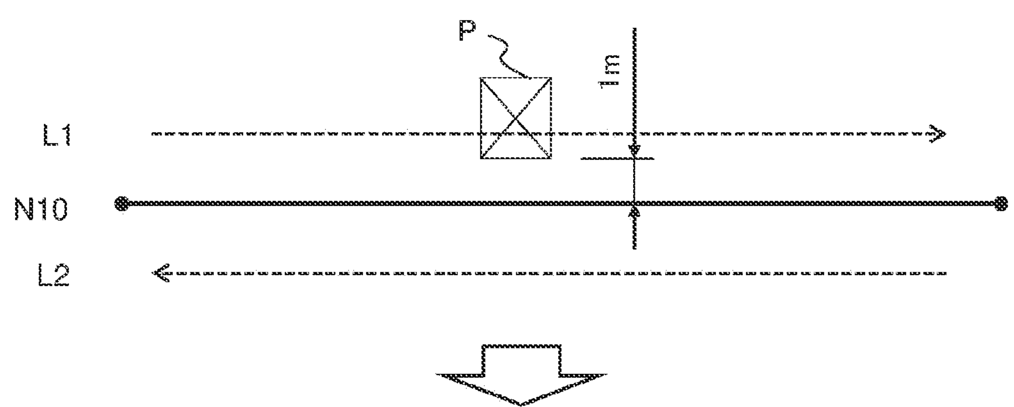
Figure 5:
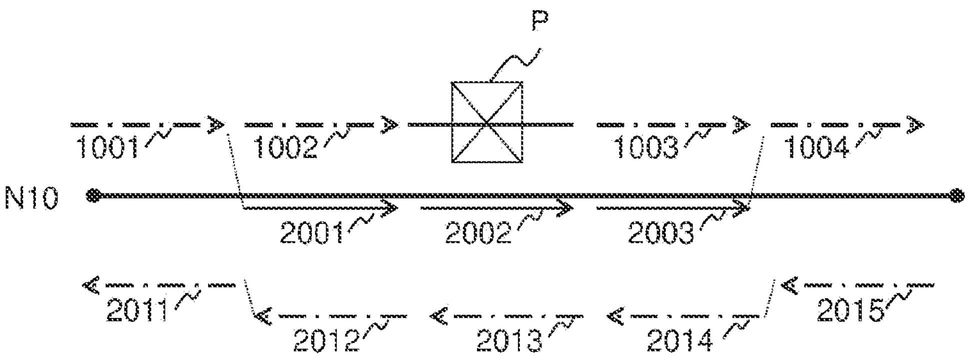
Figure 6:
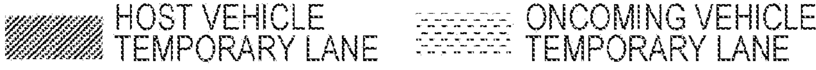
FIG. 6 is a diagram for explaining processing of a temporary lane forming unit in a case where the number of lanes of an opposing lane is one.
Figure 6:
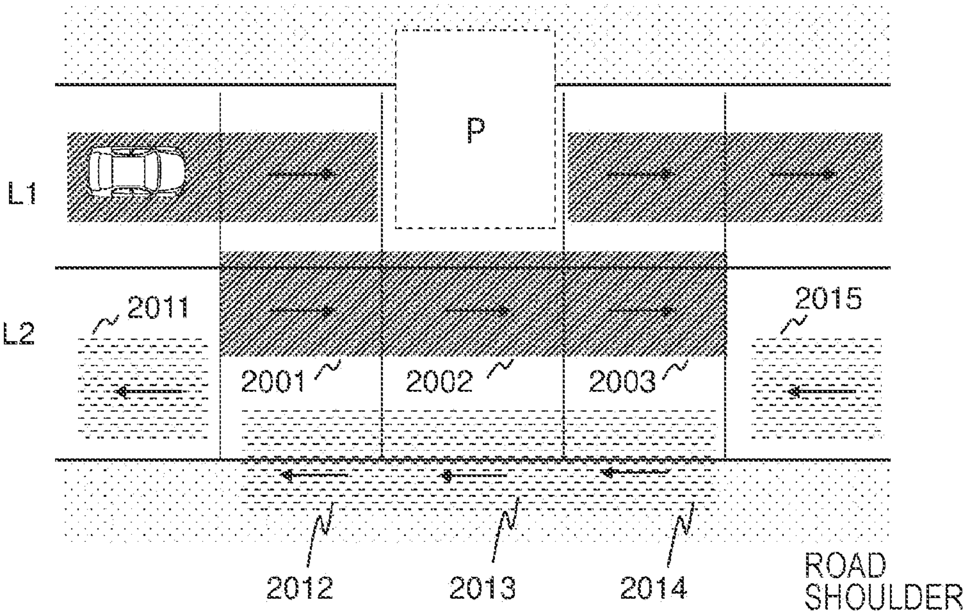

FIGS. 5 to 6 are diagrams explaining the generation of temporary lanes in a case of one lane on each side, that is, the number of lanes of the opposing lane is one. FIGS. 5 and 6 correspond to FIGS. 3 and 4, respectively. Hereinafter, differences between FIGS. 3 and 5 and differences between FIGS. 4 and 6 will be mainly described. The link shown in FIG. 5 has one lane on each side, two lanes in total. In FIG. 5 as well, a passing obstruction P occurs in the rightward lane in the drawing. In this example as well, the vehicle C travels in the rightward direction in the drawing.

Similarly to the above example, the temporary lane forming unit 134 calculates the length of a section into which the existing lane is divided. Since there is no particular difference in this point, a detailed description thereof will be omitted. Next, the temporary lane forming unit 134 calculates an offset value in the lane lateral direction based on the position and size of the passing obstruction P and the ODD 72, and forms a new lane. That is, in the example of FIG. 3, the adjacent opposite lane is used as the temporary lane as it is, but in this example, an appropriate offset value is calculated for the purpose of reducing the use of the opposite lane. For example, when the distance between the passing obstruction P and the center line is 1 m and there is a provision in the ODD 72 that "when a vehicle crosses a section line, the distance to the nearest object is 0.5 m or more", the temporary lane forming unit 134 sets temporary lanes as follows. That is, the temporary lane forming unit 134 calculates the offset value so that the distance between the left side surface of the vehicle C and the passing obstacle P is 0.5 m or more, for example, 0.8 m.

With the calculated offset value, the section 1002 is moved to generate the section 2001, and the section 2002 and the section 2003 are formed in the advancing direction. Similarly to the above example, the length of the section 2002 is determined based on the length of the passing obstacle P, and the lengths of the section 2001 and the section 2003 are determined based on the limiting speed of the region. Next, the traveling condition setting unit 135 sets the traveling condition in the temporary lane set by the temporary lane forming unit 134, that is, the section indicated by reference numerals 2001 to 2003. Since the method of setting the traveling condition is similar to that in the example illustrated in FIG. 3, the details thereof will be omitted.

FIG. 6 is a diagram illustrating temporary lanes set by the temporary lane forming unit 134 in the example of FIG. 5. In FIG. 6, the upper and lower ends in the drawing, that is, the road shoulders existing on both sides of the road are indicated by dot hatching. Unlike the example illustrated in FIG. 4, since there is only one opposing lane, a part of the lane 2012 to 2014 of the offset oncoming vehicle runs out to the road shoulder.

Figure 7:
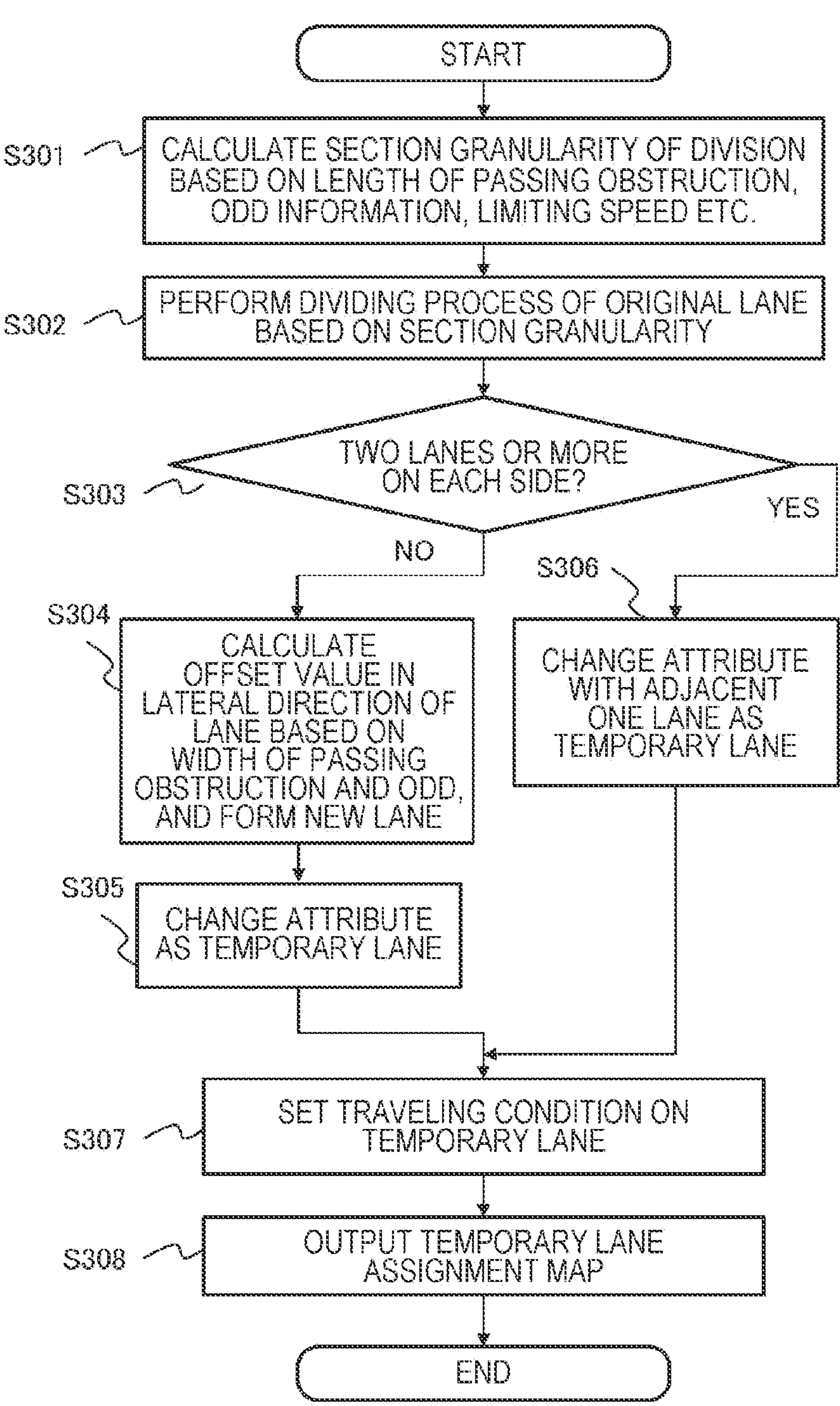
FIG. 7 is a flowchart illustrating a process of a computation device.

FIG. 7 is a flowchart illustrating a process of a computation device 10. First, in step S301, the temporary lane forming unit 134 calculates the section granularity of division based on the position and size of the obstacle acquired by the obstruction information acquisition unit 131, the ODD information acquired by the ODD management unit 133, the limiting speed information acquired by the base map acquisition unit 132, and the like. Specifically, the start point and the length of the section to be divided, or the start point and the end point of the section to be divided are specified. In subsequent step S302, the temporary lane forming unit 134 divides the lane information acquired by the base map acquisition unit 132 on the basis of the section granularity determined in step S131.

In subsequent step S303, the temporary lane forming unit 134 determines whether or not the lane to be processed is two lanes or more on each side. The temporary lane forming unit 134 proceeds to step S306 when determining that the number of lanes on each side is two or more, and proceeds to step S304 when determining that the number of lanes on each side is not two or more. In step S304, as illustrated in FIGS. 5 to 6, the temporary lane forming unit 134 calculates an offset value in the lane width direction based on the width of the passing obstacle and the ODD, and forms a new lane. In subsequent step S305, the temporary lane forming unit 134 changes the attribute of the new lane formed in step S304 to the temporary lane, and proceeds to step S307.

In step S306, as illustrated in FIGS. 3 to 4, the temporary lane forming unit 134 changes the attribute of one adjacent lane of the opposing lane to the temporary lane, and proceeds to step S307. That is, in this case, since the existing lane is used as the temporary lane as it is, it is not necessary to calculate the offset value as in step S304. In step S307, the traveling condition setting unit 135 sets the traveling condition to the temporary lane set in step S305 or step S306. In subsequent step S308, the computation device 10 generates a temporary lane assignment map 14 which is map data to which temporary lane information is assigned, outputs the temporary lane assignment map 14 to the locator 12, and ends the process illustrated in FIG. 7.

The first embodiment described above has the following operation effects.

(1) The computation device 10 includes: a base map acquisition unit 132 that acquires a high precision map 11 which is map information in a lane level; an obstruction information acquisition unit 1311 that acquires passing obstruction information on a lane on which a vehicle advancing in a first direction, for example, a rightward direction in FIG. 3 in the drawing travels; and a temporary lane forming unit 134 that divides lane information of the high precision map 11 into sections based on the passing obstruction information, and updates a part of the high precision map 11 in the lane information that is divided to form a temporary lane in which at least a region where the vehicle advancing in the rightward direction in FIG. 3 cannot travel, for example, a region of reference numerals 2001 to 2003 in FIG. 3 is changed to a region where the vehicle advancing in the rightward direction in the drawing can travel. Therefore, the computation device 10 can generate a temporary lane in which a region that cannot originally pass is rewritten so as to be passable on the map. By using the temporary lane assignment map 14 in which the temporary lane is recorded, the driving assistance device 7 can transmit at least one operation command of the accelerator, the brake, and the steering of the vehicle C to the vehicle control system 6, for example, can continue the automatic driving.

(2) As illustrated in steps S304 to S305 in FIGS. 5 to 6 and 7, the temporary lane forming unit 134 forms a new lane as a temporary lane in which an offset value in a lateral direction with respect to the original lane is defined based on information in a width direction of the lane in the passing obstruction information. Therefore, a temporary lane can be generated even on a road with one lane on each side.

(3) The temporary lane forming unit 134 generates, based on the offset value as indicated by reference numerals 2012 to 2014, a temporary lane on which a vehicle advancing in a second direction, which is the left side in FIG. 5, travels. Therefore, the temporary lane forming unit 134 can form another temporary lane for traveling beyond the road shoulder in order to avoid the vehicle C, which is an emergency vehicle traveling on the temporary lanes indicated by reference numerals 2001 to 2003 in FIG. 3.

(4) The computation device 10 includes a traveling condition setting unit 135 that calculates a speed limit based on a shape of the temporary lane or the ODD 72 that is information regarding driving assistance of the vehicle C, and adds the speed limit to an attribute of the temporary lane. Therefore, the computation device 10 can set an appropriate speed for the created temporary lane.

(5) The computation device 10 includes a communication unit 2 that transmits information on the temporary lane to another vehicle. Therefore, another vehicle can be notified of a possible travel route of the vehicle C equipped with the computation device 10 in advance, which contributes to safe traveling of surrounding vehicles and the vehicle C.

(6) The temporary lane forming unit 134 divides the lane information of the map information into sections based on the passing obstruction information. Therefore, the computation device 10 can divide the existing lane into sections according to the length of the region where no passing is allowed.

First Modified Example

In the first embodiment described above, the vehicle C equipped with the computation device 10 has been described as an emergency vehicle. However, the vehicle C may not be an emergency vehicle. In this case, the vehicle C travels in a place where legal regulations defining the traveling region of the vehicle do not reach, for example, in a factory site or a theme park. According to the present modified example, the computation device 10 also can be mounted on other than the emergency vehicle.

Second Modified Example

In the first embodiment described above, the computation device 10 includes the communication unit 2. However, the computation device 10 may not include the communication unit 2. In this case, the dynamic map 71 including the temporary lane assignment map 14 cannot be transmitted to other vehicles, but the vehicle C equipped with the computation device 10 can travel on the temporary lane as in the first embodiment.

Third Modified Example

The computation device 10 may not include the high precision map 11 and the locator 12. In this case, a device other than the computation device 10 inside the vehicle C may have a configuration corresponding to the high precision map 11 and the locator 12.

Fourth Modified Example

In the first embodiment described above, the follow-up after the vehicle C travels on the temporary lane is not particularly performed. However, the computation device 10 may retransmit the dynamic map 71 not including the temporary lane after the vehicle C travels on the temporary lane. In this case, the computation device 10 creates the dynamic map 71 using only the high precision map 11 in advance. Then, similarly to the first embodiment, the dynamic map 71 also using the temporary lane assignment map 14 is transmitted in advance, and when the vehicle C finishes traveling on the temporary lane, the dynamic map 71 using only the high precision map 11 is transmitted.

Furthermore, in the present modified example, an attribute may be set in the temporary lane so that the travelable condition of the emergency vehicle is prioritized over another vehicle. For example, the attribute may be set such that only the emergency vehicle can pass through the temporary lane, and vehicles other than the emergency vehicle cannot pass through the temporary lane.

According to the fourth modified example, the following operation effects can be obtained.

(7) The temporary lane forming unit 134 forms priority temporary lane that prioritizes a travelable condition of the vehicle C, which is an emergency vehicle, over another vehicle, and the communication unit 2 transmits information on the priority temporary lane to another vehicle. The temporary lane forming unit 134 cancels the formation of the priority temporary lane after the vehicle C passes through the priority temporary lane. Therefore, the influence of forming the temporary lane can be suppressed to a minimum.

Fifth Modified Example

In the above-described embodiment, the communication unit 2 is provided outside the computation device 10. However, the communication unit 2 may be built in the computation device 10 to be a part of the computation device 10. In addition, the computation device 10 and the driving assistance device 7 may be integrally configured, or each of the computation device 10 and the driving assistance device 7 may be configured by a plurality of pieces of hardware.

Sixth Modified Example

In the above-described embodiment, there are two types of temporary lanes, a section corresponding to the passing obstacle P and a section for lane change. However, sections other than these sections may be further provided. For example, a section for adjusting the speed may be further provided in order to alleviate the rapid change in speed in the temporary lane.

Second Embodiment

A second embodiment of an computation device will be described with reference to FIG. 8. In the following description, the same reference numerals are denoted on the same components as those of the first embodiment, and the differences will be mainly described. The points that are not particularly described are the same as those in the first embodiment. The present embodiment is different from the first embodiment mainly in that an entry determination unit is provided.

Figure 8:
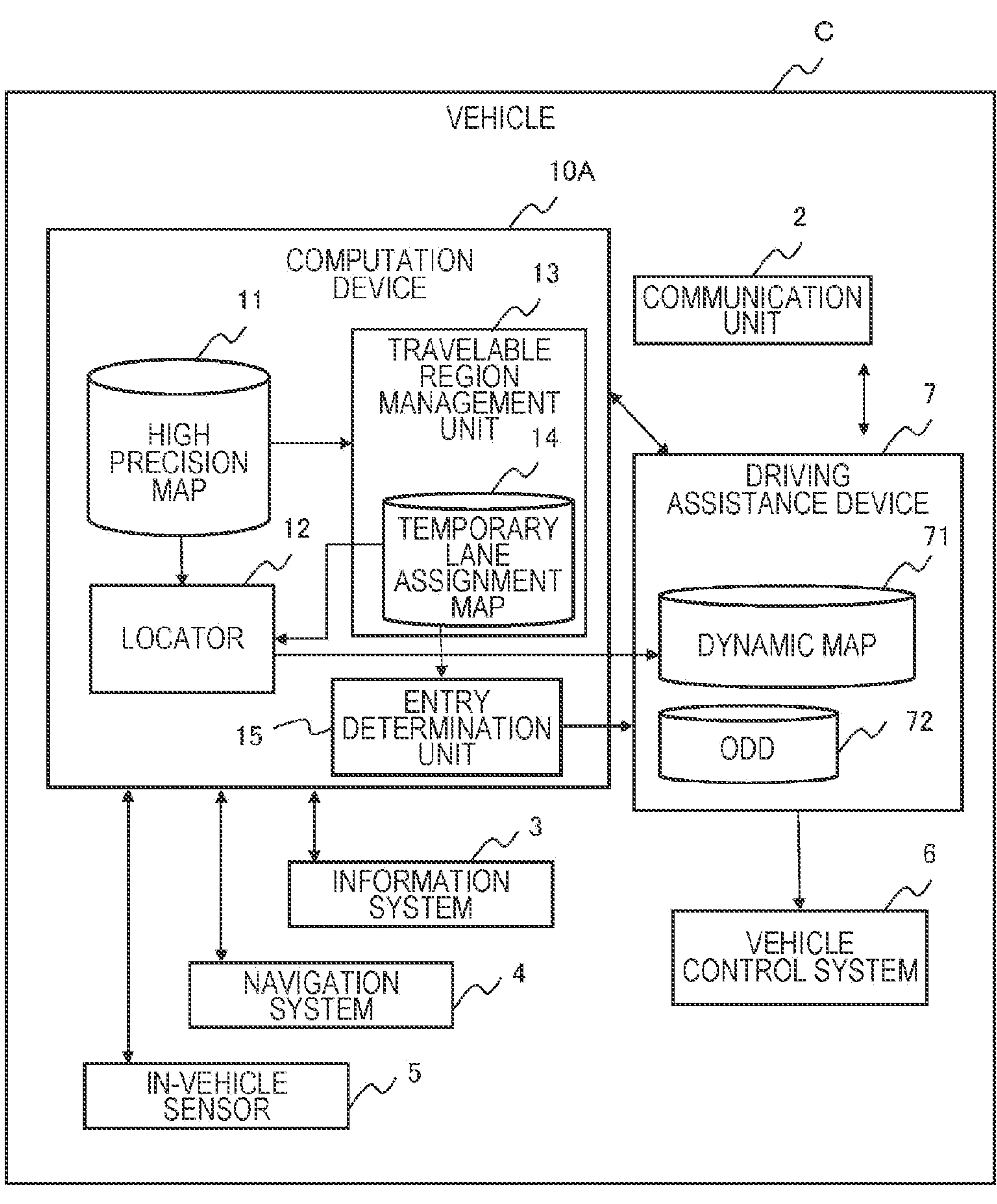
FIG. 8 is a functional configuration diagram of a vehicle equipped with a computation device according to a second embodiment.

FIG. 8 is a functional configuration diagram of a vehicle C equipped with a computation device 10A according to the second embodiment. The computation device 10A includes an entry determination unit 15 in addition to the configuration in the first embodiment. The entry determination unit 15 receives the temporary lane assignment map 14 generated by the travelable region management unit 13 and the output of the in-vehicle sensor 5. The entry determination unit 15 determines whether or not entry to the temporary lane is possible using the output of the in-vehicle sensor 5, and outputs a determination result to the driving assistance device 7. When notified from the entry determination unit 15 that entry is possible, the driving assistance device 7 enters the temporary lane.

Specifically, the entry determination unit 15 first specifies the relative positional relationship between the temporary lane and the vehicle C using the positional information included in the output of the in-vehicle sensor 5 and the temporary lane assignment map 14. Next, entry determination unit 15 determines whether the positional information of the obstacle included in the output of in-vehicle sensor 5 overlaps the position of the temporary lane. When determining that the two overlap, the entry determination unit 15 determines that entry to the temporary lane is not possible. When determining that the two do not overlap, the entry determination unit 15 determines that entry to the temporary lane is possible.

The second embodiment described above has the following operation effect.

(8) The computation device 10A includes an entry determination unit 15 that confirms that an oncoming vehicle has not entered with an external sensor and determines whether or not entry to a temporary lane is possible. Therefore, the vehicle C equipped with the computation device 10A can safely enter the temporary lane using the entry determination unit 15.

In each of the embodiments and modified examples described above, the configuration of the functional block is merely an example. Some functional configurations illustrated as separate functional blocks may be integrally configured, or a configuration illustrated in one functional block diagram may be divided into two or more functions. In addition, some of the functions of each functional block may be included in another functional block.

In each of the embodiments and modified examples described above, the program is stored in the ROM (not illustrated), but the program may be stored in a non-volatile storage device illustrated). In addition, the computation device may include an input/output interface (not illustrated), and the program may be read from another device via a medium that can be used by the input/output interface and the computation device when necessary. Here, the medium refers to, for example, a storage medium detachable from the input/output interface, or a communication medium, that is, a wired, wireless, or optical network, or a carrier wave or a digital signal propagating through the network. Some or all of the functions realized by the program may be realized by a hardware circuit or an FPGA.

Each of the embodiments and the modified examples described above may be combined. Although various embodiments and modified examples have been described above, the present invention is not limited to the contents thereof. Other modes that can be considered within the scope of the technical idea of the present invention are also encompassed within the scope of the present invention.

REFERENCE SIGNS LIST

2 communication unit
5 in-vehicle sensor
7 driving assistance device
10, 10A computation device
11 high precision map
13 travelable region management unit
14 temporary lane assignment map
15 entry determination unit
71 dynamic map
131 obstruction information acquisition unit
132 base map acquisition unit
133 ODD management unit
134 temporary lane forming unit
135 traveling condition setting unit

The invention claimed is:

1. A device comprising:
a controller configured to
acquire map information in a lane level;
acquire passing obstruction information on a lane on which a vehicle advancing in a first direction travels;
divide lane information of the map information into sections based on the passing obstruction information, and update a map attribute in the lane information that is divided to form a temporary lane in which at least a region where the vehicle advancing in the first direction cannot travel is changed to a region where the vehicle advancing in the first direction can travel;
communicate with a communication interface configured to transmit information on a priority temporary lane to a non-emergency vehicle; and
form the priority temporary lane that prioritizes a travelable condition of an emergency vehicle over the non-emergency vehicle, and cancel the formation of the priority temporary lane after the emergency vehicle passes through the priority temporary lane.

2. The device according to claim 1, wherein the controller is further configured to form a new lane as a temporary lane in which an offset value in a lateral direction with respect to an original lane is defined based on information in a width direction of the lane in the passing obstruction information.

3. The device according to claim 2, wherein the controller is further configured to generate, based on the offset value, a temporary lane on which a vehicle advancing in a second direction opposite to the first direction travels.

4. The device according to claim 1, wherein the controller is further configured to calculate a speed limit based on a shape of the temporary lane or information regarding driving assistance of a vehicle equipped with the device, and to add the speed limit to an attribute of the temporary lane.

5. The device according to claim 1, wherein the controller is further configured to confirm based on information from an external sensor, whether an oncoming vehicle is present in the temporary lane, and determine whether the temporary lane is clear for entry based on the absence of the oncoming vehicle.

6. The device according to claim 1, wherein the controller is further configured to divide the lane information of the map information into sections based on the passing obstruction information and a limiting speed.

7. A lane forming method executed by a computer, the lane forming method comprising:
acquiring map information in a lane level;
acquiring passing obstruction information on a lane on which a vehicle advancing in a first direction travels;
dividing lane information of the map information into sections based on the passing obstruction information, and updating a map attribute in the lane information that is divided to form a temporary lane in which at least a region where the vehicle advancing in the first direction cannot travel is changed to a region where the vehicle advancing in the first direction can travel,
communicating with a communication interface configured to transmit information on a priority temporary lane to a non-emergency vehicle, and
forming the priority temporary lane that prioritizes a travelable condition of an emergency vehicle over the non-emergency vehicle, and cancel the formation of the priority temporary lane after the emergency vehicle passes through the priority temporary lane.

* * * * *